US011630445B2

(12) United States Patent
Takezawa et al.

(10) Patent No.: US 11,630,445 B2
(45) Date of Patent: Apr. 18, 2023

(54) INFORMATION PROCESSING METHOD, INFORMATION PROCESSING APPARATUS AND NON-TRANSITORY STORAGE MEDIUM

(71) Applicant: TOYOTA JIDOSHA KABUSHIKI KAISHA, Toyota (JP)

(72) Inventors: Yoshiyasu Takezawa, Okazaki (JP); Hirotaka Todaka, Toyota (JP); Takao Kiguchi, Nagoya (JP); Chieko Sawada, Nagoya (JP); Yosuke Tokuda, Toyota (JP); Ayaka Kagami, Inazawa (JP); Natsuki Sugiyama, Nisshin (JP); Takuzo Hirano, Nagoya (JP); Taichi Amakasu, Toyota (JP); Seiei Hibino, Nagakute (JP); Hiroshi Kawakami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 17/202,562

(22) Filed: Mar. 16, 2021

(65) Prior Publication Data
US 2021/0294309 A1 Sep. 23, 2021

(30) Foreign Application Priority Data
Mar. 19, 2020 (JP) .............................. JP2020-049496

(51) Int. Cl.
*G05B 19/418* (2006.01)

(52) U.S. Cl.
CPC .................. *G05B 19/41865* (2013.01); *G05B 2219/32365* (2013.01)

(58) Field of Classification Search
None
See application file for complete search history.

(56) References Cited

U.S. PATENT DOCUMENTS

| 6,094,603 A * | 7/2000 | Ishii ....................... G06Q 10/06 700/106 |
| 6,345,208 B1 * | 2/2002 | Yoshiyuki .............. G06Q 10/06 700/106 |

(Continued)

FOREIGN PATENT DOCUMENTS

| EP | 2610696 A1 * | 7/2013 |
| JP | 2002-118042 A | 4/2002 |
| JP | 2006015425 A * | 1/2006 |

*Primary Examiner* — Jason Lin
(74) *Attorney, Agent, or Firm* — Oliff PLC

(57) ABSTRACT

The present disclosure makes it possible to construct a production line of products using pieces of first equipment located in a geographical area and mobile second equipment. An information processing method tries to assign pieces of first equipment to a series of work processes to produce products based on the pieces of first equipment located in the geographical area and positions thereof, decides installation of pieces of second equipment to be assigned to a part of the series of work processes to which a part of the pieces of equipment cannot be assigned from among the pieces of first equipment when there is the part of the series of work processes to which the part of the pieces of equipment cannot be assigned from among the pieces of first equipment, outputs a request to transport the pieces of second equipment to an installation position in the geographical area.

9 Claims, 15 Drawing Sheets

(56) References Cited

U.S. PATENT DOCUMENTS

| | | | | |
|---|---|---|---|---|
| 6,347,497 B1* | 2/2002 | Simonis | .................. | B23P 19/00 |
| | | | | 211/186 |
| 7,123,975 B2* | 10/2006 | Chen | .................... | G06Q 10/087 |
| | | | | 700/106 |
| 7,228,192 B2* | 6/2007 | Popplewell | ............ | G05B 19/12 |
| | | | | 29/430 |
| 7,684,888 B2* | 3/2010 | Chen | .................. | G05B 19/4189 |
| | | | | 700/121 |
| 2009/0259961 A1* | 10/2009 | Bakli | ................ | G05B 19/0426 |
| | | | | 700/96 |
| 2012/0011326 A1* | 1/2012 | Higashijima | ....... | G06F 12/0804 |
| | | | | 711/142 |
| 2015/0349136 A1* | 12/2015 | Koo | .................... | H01L 27/1218 |
| | | | | 257/43 |
| 2018/0307215 A1* | 10/2018 | Kim | ................ | G05B 19/41845 |

\* cited by examiner

Fig. 5

ORDER INFORMATION

| PERSONAL INFORMATION ABOUT ORDERER |
| --- |
| TYPE OF PRODUCTS |
| QUANTITY |
| DELIVERY DEADLINE |
| DELIVERY PLACE AND POSITION |

Fig. 8

PRODUCTION LINE INFORMATION DB

| PRODUCED ARTICLE | WORK PROCESS | CORRESPONDING EQUIPMENT | PRODUCTION CAPACITY | OPERATION RATE (INITIAL VALUE) |
|---|---|---|---|---|
| PD1 | ST1, ST2, ST3, ST4, ST5 | a, b, c, d, e | | |
| PD2 | ST6, ST7, ST8 | f, g, h | | |
| PD3 | ST10, ST11, ST12, ST13 | i, j, k, m | | |
| . | . | . | . | . |

Fig. 9

FIXED FACILITY DB

| FACILITY | POSITION | FIXED EQUIPMENT | PROCESS | SPECIFICATIONS | AMOUNT OF PROCESSING (PRODUCTION CAPACITY) | OCCUPATION RATE OF OTHER USES | INSTALLATION SPACE |
|---|---|---|---|---|---|---|---|
| F1 | p1 | A | ST1 | SZ1 | AM1 | 0 | WITH |
|  |  | B | ST2 | SZ2 | AM2 | 0 |  |
|  |  | D | ST4 | SZ3 | AM4 | 0 |  |
| F2 | p2 | A | ST1 | SZ1 | AM1 | 0 | WITH |
|  |  | B | ST2 | SZ2 | AM2 | 0 |  |
|  |  | D | ST4 | SZ3 | AM4 | 0 |  |
|  |  | E | ST5 | SZ4 | AM5 | 0 |  |
| F3 | p3 | B | ST2 | SZ2 | AM2 | 0 | WITHOUT |
|  |  | C | ST3 | SZ3 | AM3 | 0 |  |
| F4 | p4 | D | ST4 | SZ3 | AM4 | 0 |  |
| F5 | p5 | · | · | · | · | · | · |

Fig. 11

MOBILE EQUIPMENT DB

| IDENTIFICATION INFORMATION | CLASSIFICATION | STATUS | POSITION | SPEIFICATIONS | AMOUNT OF PROCESSING (PRODUCTION CAPACITY) | FORM OF PROVISION |
|---|---|---|---|---|---|---|
| ID1 | A | UNUSED | p11 | SZ11 | AM1 | EQUIPMENT ALONE |
| ID2 | A | USED | p12 | SZ12 | AM1 | MOBILE FACILITY |
| ID3 | B | UNUSED | p13 | SZ13 | AM2 | EQUIPMENT ALONE |
| ID4 | C | UNUSED | p14 | SZ14 | AM3 | EQUIPMENT ALONE |
| ID5 | C | UNUSED | p15 | SZ15 | AM4 | MOBILE FACILITY |
| ID6 | D | USED | p16 | SZ16 | AM5 | MOBILE FACILITY |
| ID7 | E | UNUSED | p17 | SZ7 | AM6 | EQUIPMENT ALONE |
| ID8 | E | UNUSED | p18 | SZ8 | AM6 | EQUIPMENT ALONE |
| · | · | · | · | · | · | · |

Fig. 12

EXTERNAL INSTALLATION SPACE DB

| IDENTIFICATION INFORMATION | POSITION | INSTALLABLE EQUIPMENT |
|---|---|---|
| SP1 | p21 | |
| SP2 | p22 | |
| SP3 | p23 | |
| SP4 | p24 | |

Fig. 13

CORRESPONDENCE TABLE

| DISTANCE OR TRANSPORT TIME | COEFFICIENT k |
|---|---|
| d1 | 1 |
| d2 | 0.9 |
| d3 | 0.8 |
| . | . |
| n | 0.1 |

INFORMATION PROCESSING METHOD, INFORMATION PROCESSING APPARATUS AND NON-TRANSITORY STORAGE MEDIUM

CROSS REFERENCE TO THE RELATED APPLICATION

This application claims the benefit of Japanese Patent Application No. 2020-049496, filed on Mar. 19, 2020, which is hereby incorporated by reference herein in its entirety.

BACKGROUND

Technical Field

The present disclosure relates to an information processing method, an information processing apparatus and a non-transitory storage medium.

Description of the Related Art

Conventionally, among methods for manufacturing semiconductors using a production line configured with a plurality of manufacturing processes, the following method exists. An amount of demand for semiconductors at the initial stage of production is set, and a mini-line with an amount of production that is almost equal to or smaller than the set amount of demand is configured. After that, when the amount of demand for semiconductors increases, a plurality of mini-lines, with the mini-line as the minimum unit, are sequentially configured to increase the amount of production (for example Patent document 1).

CITATION LIST

Patent Document

Patent document 1: Japanese Patent Laid-Open No. 2002-118042

SUMMARY

One or more aspects of the present disclosure are directed to provide an information processing method making it possible to construct a production line of products using first equipment located in a geographical area and mobile second equipment, an information processing apparatus and a storage medium non-transitorily storing a program.

One of aspects of the present disclosure may be an information processing method. This information processing method may include: trying to assign a plurality of pieces of equipment to a series of work processes to produce products based on information indicating the plurality of pieces of first equipment located in a geographical area and information indicating respective positions about the plurality of pieces of first equipment; deciding installation of pieces of mobile second equipment to be assigned to a part of the series of work processes to which a part of the plurality of pieces of equipment cannot be assigned from among the plurality of pieces of first equipment when there is the part of the series of work processes to which the part of the plurality of first equipment cannot be assigned from among the plurality of pieces of first equipment in any of the series of work processes; and outputting a request to transport the pieces of second equipment to an installation position in the geographical area.

Aspects of the present disclosure may include at least one of an information processing apparatus and a recording medium in which a program is recorded including characteristics similar to the information processing method. Further, the aspects of the present disclosure may include an information processing system including an information processing apparatus, a terminal of an orderer, terminals of managers of first equipment or fixed facilities, and a terminal of a manager of second equipment or transport vehicles for the second equipment, each of which is connected to the information processing apparatus via a network, and may include each of a server and each of the terminals in the information processing system.

According to the present disclosure, it is possible to construct a production line of products in a geographical area, using first equipment located in the geographical area and mobile second equipment.

BRIEF DESCRIPTION OF THE DRAWINGS

FIG. 5 illustrates a format example of order information;

FIG. 8 illustrates a data structure example of a production line information database;

FIG. 9 illustrates a data structure example of a fixed facility database;

FIG. 11 illustrates a data structure example of a mobile equipment database;

FIG. 12 illustrates a data structure example of an external installation space database;

FIG. 13 illustrates a data structure example of a correspondence table;

DESCRIPTION OF THE EMBODIMENT

Figure 1:
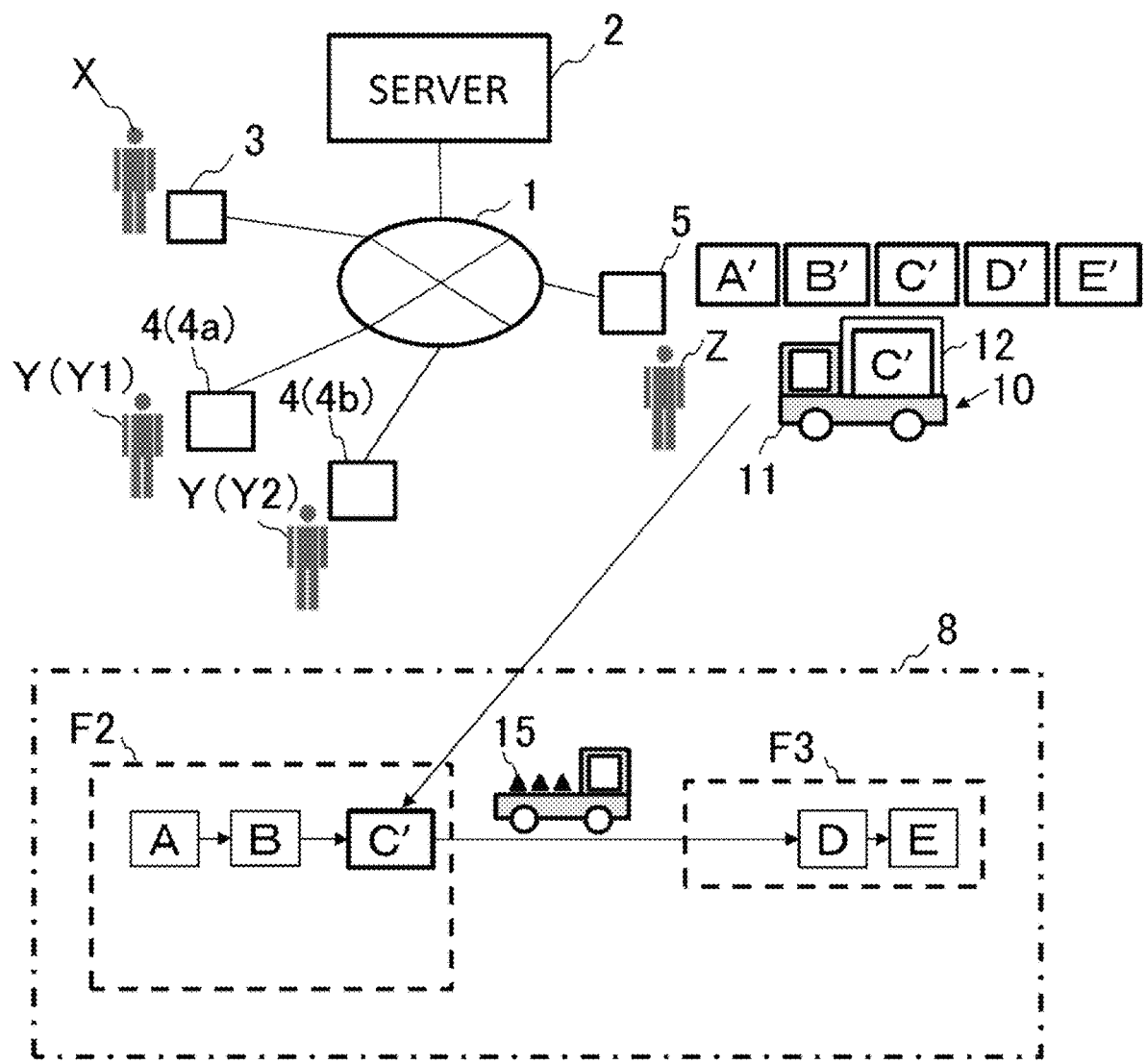
FIG. 1 is a schematic diagram of an information processing system according to an embodiment.

There may be a case where it is requested to take a system for increasing production of products in response to temporary expansion of demand for the products. At this time, it is not necessarily favorable from a viewpoint of costs such as initial costs and maintenance costs to prepare all of a plurality pieces of equipment used for a series of work procedures performed in a production line of the products. In existing fixed facilities such as a factory, pieces of equipment each of which can be used as any of the plurality of pieces of equipment are provided. However, when the pieces of equipment are a part of the plurality of pieces of equipment, it is not possible to produce final products in that facility. Therefore, it is conceivable to construct a production line across a plurality of fixed facilities. However, there may be a case where at least one of the plurality of pieces of equipment is not in a geographical area, and it is not possible to construct the production line. When only one of the pieces of equipment exists outside the geographical area, it takes time to transport semi-manufactured products, and there is a possibility that the production capacity of the production line significantly decreases.

An information processing method, an information processing apparatus and a storage medium non-transitorily storing a program according to the embodiment are intended to attempt to construct a production line corresponding to an order by trying to construct the production line with a plurality of pieces of first equipment located in a geographical area with such a size that a transport distance problem is not so significant, and supplementing missing equipment with mobile second equipment. In the description below, the mobile second equipment may be called "mobile equipment, and the first equipment may be called "fixed equipment" using "fixed" which is an antonym of "mobile". Here, "mobile" means that equipment is portable.

The information processing method according to the embodiment may perform the following:
(1) Trying to assign a plurality of pieces of first equipment to a series of work processes to produce products based on information indicating the plurality of pieces of first equipment located in a geographical area and respective position information about the plurality of pieces of first equipment;
(2) Deciding installation of a piece of mobile second equipment to which a part of the plurality of pieces of equipment is to be assigned to a part of the series of work processes to which the part of the plurality of pieces of equipment cannot be assigned from among the plurality of pieces of first equipment when there is a part of the series of work processes to which the part of the plurality of equipment cannot be assigned from among the plurality of pieces of first equipment in any of the series of work processes; and
(3) Outputting a request to transport the piece of second equipment to an installation position in the geographical area.

According to the information processing method, when there is not a piece of first equipment to which any of the plurality of pieces of equipment can be assigned in a geographical area, installation of a piece of second equipment is decided, and a request to transport the piece of second equipment to an installation position in the geographical area is outputted. By the piece of second equipment being installed at the installation position in response to the request, it is possible to prepare the pieces of first equipment and the piece of second equipment to which the plurality of pieces of equipment is to be assigned, in the geographical area, and it is possible to construct such a production line that influence of transport time is suppressed.

The type of the products is not limited, and industrial products and food are also included. The size of the geographical area can be appropriately set. However, the size is decided in consideration of distances among the pieces of equipment. As the geographical area, the premises and the like of one fixed facility are included. The fixed facility is a facility where the pieces of first equipment are installed, and a building, premises and the like of a factory, a research institute and a development facility are included. The pieces of first equipment are machines and equipment used for corresponding work processes, and each of the pieces of first equipment can be used as any of the "plurality of pieces of equipment" (that is, any of the plurality of pieces of equipment can be assigned).

In the information processing method, a configuration may be adopted in which each of the plurality of pieces of first equipment is located in any of a plurality of fixed facilities, any of the plurality of fixed facilities is selected, and the plurality of pieces of equipment is assigned to pieces of first equipment located in the selected fixed facility. It is favorable that distances among the plurality of pieces of equipment with which a production line is constructed are short in order to prevent the length of the production line from being unnecessarily long. In other words, it is favorable that the plurality of pieces of equipment is collectively exist in one facility. Therefore, by selecting pieces of first equipment in units of fixed facilities and assigning the plurality of pieces of equipment to pieces of first equipment in the fixed facilities, the distances among the pieces of equipment are shortened.

Further, it is preferable that the selection about any of the plurality of fixed facilities is performed in descending order about numbers of pieces of first equipment located in the plurality of fixed facilities to which the plurality of pieces of equipment can be assigned. A reason is that it is thought that, as the number of pieces of equipment handled in one fixed facility is larger, the number of those who manage the plurality of pieces of equipment can be reduced, and time and effort for the management can be saved. Further, another reason is that, since it means that pieces of first equipment to which a plurality of pieces of equipment can be assigned collectively exist in one fixed facility that the number of pieces of first equipment located in the one fixed facility is large, and it is thought the number of pieces of second equipment to be replenishes or supplemented and time and effort for transporting the pieces of second equipment can be reduced.

Further, when a first fixed facility selected from the plurality of fixed facilities includes an installation space for second equipment though pieces of first equipment to which all the plurality of pieces of equipment can be assigned are not located there, installation of second equipment in the installation space is decided. By doing so, the second equipment can be placed near the first equipment, and the second equipment and the first equipment can be handled in the one fixed facility.

The following configuration may be adopted. When all of pieces of second equipment to which unassigned pieces of equipment that are not assigned to pieces of first equipment are to be assigned, among the plurality of pieces of equipment, are not installed in the installation space for second equipment, a second fixed facility existing within a predetermined distance from the first fixed facility is searched for. Then, the unassigned pieces of equipment are assigned to pieces of first equipment located in the second fixed facility. By doing so, the distance between the facilities is within the predetermined distance, and, thereby, it is possible to reduce a transport distance of semi-manufactured products.

The following configuration may be adopted. When all of the pieces of second equipment to which the unassigned pieces of equipment are to be assigned cannot be installed in the installation space for second equipment, installation of the pieces of second equipment to which the unassigned pieces of equipment are to be assigned, in an external installation space existing within a predetermined distance from the first fixed facility is decided. The external installation space refers to a space other than the fixed facility, where the pieces of second equipment can be installed. As the external installation space, for example, a vacant space, a parking lot, the inside of a warehouse and the like are given, but the external installation space is not limited thereto.

The following configuration may be adopted. When assignment about all the plurality of pieces of equipment to the pieces of first equipment and the pieces of second equipment ends, a quantity of production of products per unit time by a production line using the pieces of first equipment and the pieces of second equipment to which the plurality of pieces of equipment is assigned is calculated. At this time, when the production line is constructed across bases including the fixed facility and the external installation space, the quantity of production of products per unit time is multiplied by a coefficient corresponding to a distance between the bases. The word "base" includes a fixed facility and an external installation space, and the words "between the bases" includes between fixed facilities, between external installation spaces and between a fixed facility and an external installation space. The quantity of production per unit time is a product of production capacity and an operation rate of the production line. Multiplication of the quantity of production per unit time by the coefficient includes multiplication of the production capacity or the operation rate by the coefficient.

The information processing method may adopt the following configuration. As for the quantity of production per unit time, when a quantity of products requested to be delivered by a deadline are not produced, construction of an additional production line using a plurality of pieces of first equipment and pieces of second equipment installed in the geographical area is decided. By doing so, it becomes possible to produce the requested quantity of products by the deadline using the production line (a first production line) and the additional production line (a second production line). The second production line refers to a production line different from the first production line. When the requested quantity of products is not produced by the deadline even using the one second production line, two or more second production lines are constructed.

Though there are no conditions for definition of the geographical area, the size of the geographical area is set to a size that does not cause transport time to be significantly long. For example, the inside of the premises of one fixed facility can be set as the geographical area as described above. Or alternatively, a circular area with a predetermined radius with a predetermined point as the center can be set as the geographical area. However, the outer edge shape of the geographical area is not restricted, and an oval, a triangle, a polygon with four or more sides and the like are included. Or alternatively, a predetermined administrative division (a municipality, a special ward or the like) can be also set as the geographical area. As for the predetermined point, it is preferable to set a position of a delivery place of the products as the predetermined point so that the length of a transport route to the delivery place is shortened.

EMBODIMENT

An information processing method, an information processing apparatus and a storage medium non-transitorily storing a program according to an embodiment will be described with reference to drawings. A configuration of the embodiment is a mere example, and the present disclosure is not limited to the configuration of the embodiment.

<System Configuration>

FIG. 1 is a schematic diagram of an information processing system according to the embodiment. The information processing system supports construction of a production line of ordered products. In FIG. 1, the information processing system includes a network 1, a server 2 connected to the network 1, terminals 3, 4 and 5 communicable with the server 2.

The network 1 is a public communication network such as the Internet, and a WAN (wide area network) or other communication networks can be adopted. The network 1 may include a cellular network such as LTE (Long Term Evolution), or a wireless network (a wireless route) such as a wireless LAN (local area network; including Wi-Fi (registered trademark)).

The server 2 is an example of the "information processing apparatus". The server 2 performs a process for supporting construction of a production line of products configured with a plurality of a series of work processes by communication with each of the terminals 3, 4 and 5. The "production line" indicates a flow according to a work procedure (order of the work processes) in each of systems of line production, cell production and production according to functions. Therefore, existence of conveyors for conveying raw materials, materials, semi-manufactured products is not essential for the production line.

Each of the terminals 3, 4 and 5 includes a communication function. The terminal 3 is a terminal used by an orderer X. The terminal 3 is used to send a product production request (order information). However, a transmission source of the order information acquired by the server 2 may be what is other than the terminal 3. Further, the order information may be inputted directly to the server 2 using an input device or may be read from a storage device (a removable storage medium such as a USB memory) connected to the server 2.

The terminals 4 are terminals used by managers Y of fixed facilities, each of which is provided with a piece of equipment to which any of the plurality of pieces of equipment used for the series of work processes for producing products can be assigned. The equipment located in the fixed facility are referred to as fixed equipment (corresponding to the first equipment).

The terminal 5 is a terminal used by a manager Z of mobile equipment (corresponding to the second equipment). The pieces of mobile equipment are portable pieces of equipment, to each of which any of the plurality of pieces of equipment can be assigned. The pieces of mobile equipment are transported to an installation place in the fixed facility that is a destination by vehicle 10.

For example, it is assumed that products ordered by the orderer X are produced by a production line configured with a series of five work processes. For example, the first (initial) work process is creation of material, and a piece of equipment a is used. The second work process is first processing, and a piece of equipment b is used. The third work process is second processing, and a piece of equipment c is used. The fourth process is assembly, and a piece of equipment d is used. The fifth (last) process is inspection, and a piece of equipment e is used.

It is assumed that all pieces of fixed equipment to which the plurality of pieces of equipment a to e used for (corresponding to) the series of work processes are not located in one fixed facility, and there is a fixed facility provided with a part of the plurality of pieces of equipment a to e. In the example of FIG. 1, a fixed facility F2 where pieces of fixed equipment A and B to which the pieces of equipment a and b used in the first and second processes can be assigned are located exists in a geographical area 8. Therefore, it can be said that fixed facilities A and B can be assigned to the first and second processes. Further, in the geographical area 8, a fixed facility F3 where pieces of fixed equipment D and E to which the pieces of equipment d and e used in the fourth and fifth processes can be assigned are located exists. Therefore, it can be said that fixed facilities D and E can be assigned to the fourth and fifth processes. In the fixed facilities F2 and F3, a piece of fixed equipment to which the piece of equipment c can be assigned is not located.

Supplementation of equipment by mobile equipment is performed, using the server 2. In the example illustrated in FIG. 1, a request to transport a piece of mobile equipment to which the piece of equipment c can be assigned (referred to as a piece of mobile equipment C'; indicated by a line thicker than lines of the fixed facilities in FIG. 1) to an installation place in the fixed facility F2 is sent from the server 2 to the terminal 5 of the manager Z. The manager Z who receives the request puts the piece of mobile equipment C' on a vehicle 10 and makes a schedule to transport the piece of mobile equipment C' to the destination (the installation place in the fixed facility F2). In this way, the piece of mobile equipment C' is carried into the fixed facility F2 using the vehicle 10. Thereby, it becomes possible to execute the first, second and third processes using the pieces of fixed equipment A and B located in the fixed facility F2 and the piece of mobile equipment C' which is installed in the fixed facility F2 and to which the piece of equipment c is assigned. Therefore, it may become possible to execute the first, second and third processes using the pieces of fixed equipment A and B, and the piece of mobile equipment C.

The vehicle 10 may be a general-purpose transport vehicle (including a truck, a trailer and the like) or may be a dedicated transport vehicle. A piece of mobile equipment itself may be provided alone or may be provided together with a mobile housing (called a mobile facility) like a container box, the piece of mobile equipment being provided inside. For example, when a roof is not provided at an installation place in a fixed facility, a mobile facility is provided. When the vehicle 10 is a transport vehicle dedicated for mobile equipment, the vehicle 10 can be configured to be separated into a lower unit 11 including a self-propelled mechanism and an upper unit 12 that is a mobile facility provided with mobile equipment. In this case, the upper unit 12 separated from the lower unit 11 may be placed in a fixed facility, and an internal space of the upper unit 12 may be used as a space for performing a predetermine work process. The vehicle 10 may be such that is driven by a driver or may be such that moves by autonomous driving. The manager Z may be the driver.

In the fixed facility F2, semi-manufactured products 15 are produced by the first to third processes using the pieces of fixed equipment A and B and the piece of mobile equipment C'. The semi-manufactured products 15 are transported to the fixed facility F3. In the fixed facility F3, remaining work processes are performed using the pieces of fixed equipment D and E located in the fixed facility F3. Transport of the semi-manufactured products 15 may be performed using the vehicle 10 or what is other than the vehicle 10.

For example, when a distance between the fixed facility F2 and the fixed facility F3 is larger than a predetermined value, though the fixed facility F2 includes a space where pieces of mobile equipment corresponding to the pieces of equipment c to e can be installed, the distance between the fixed facility F2 and the fixed facility F3 may be long. In this case, there is a possibility that transport time between both facilities influences time required for production. In such a case, the pieces of mobile equipment to which the pieces of equipment c to e can be assigned (pieces of mobile equipment C', D' and E') are installed in the fixed facility F2 so that all the work processes are performed in the fixed facility F2.

Such supplementation by installation of mobile equipment in a fixed facility or supplementation by combination of a plurality of fixed facilities and installation of mobile equipment in the fixed facilities is performed. Thereby, it is possible to construct the production line of products for performing the series of work processes using the fixed equipment and the mobile equipment. However, it is also possible to construct the production line using only the fixed equipment, between the fixed equipment and the mobile equipment.

<Server Configuration>

Figure 2:
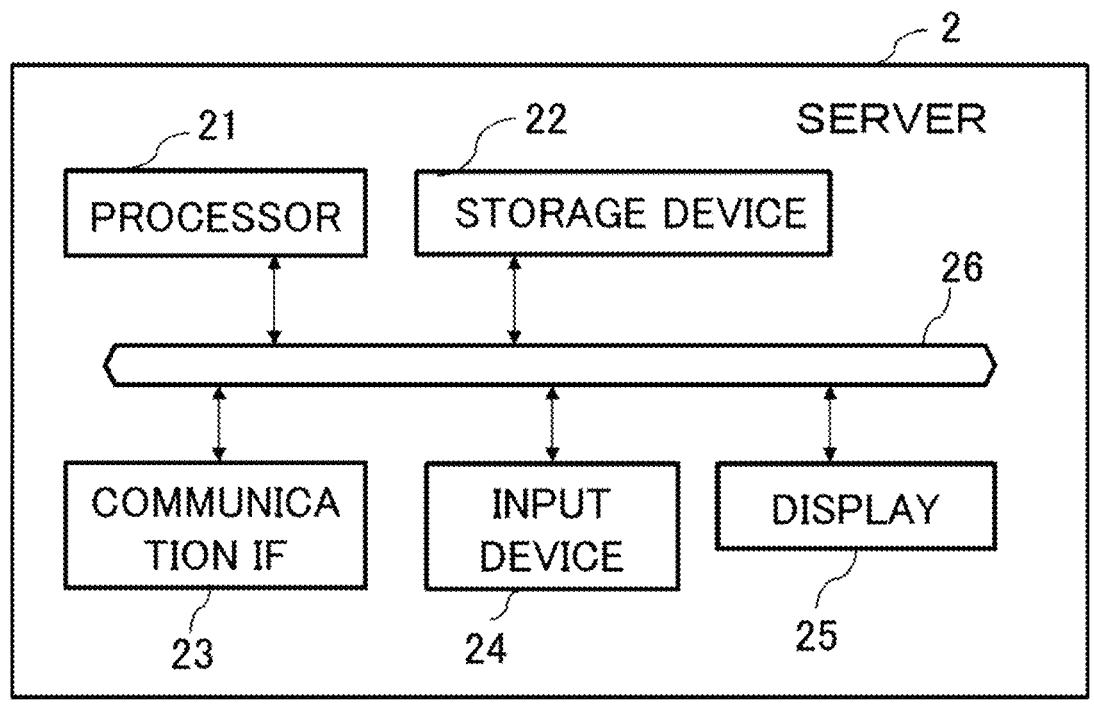
FIG. 2 illustrates a configuration example of a server.

FIG. 2 illustrates a configuration example of a server 2. The server 2 can be configured with a general-purpose information processing apparatus (a computer) such as a personal computer (PC) or a workstation (WS), or a dedicated information processing apparatus such as a server machine. The server 2 includes a communication function and can be wiredly or wirelessly connected to the network 1.

The server 2 includes a processor 21 as a processor or a control unit (a controller), a storage device 22, a communication interface (a communication IF) 23, an input device 24 and a display 25 that are mutually connected via a bus 26. The server 2 may be one information processing apparatus or a set of two or more information processing apparatuses (a cloud).

The storage device 22 includes a main memory and an auxiliary storage device. The main memory is used as a storage area for programs and data, a program development area, a program working area and a communication data buffer area and the like. The main memory is configured with a RAM (random access memory) or a combination of a RAM and a ROM (read-only memory). The auxiliary storage device is used as a storage area for data and programs. As the auxiliary storage device, for example, non-volatile storage media such as a hard disk, a solid-state drive (SSD), a flash memory and an EEPROM (electrically erasable programmable read-only memory) are included.

The communication IF 23 is a circuit to perform a communication process. For example, the communication IF 23 is a network interface card (NIC). The communication IF 23 may further be provided with a circuit to perform wireless communication in accordance with a wireless communication standard including LTE and wireless LAN (Wi-Fi (registered trademark)).

The input device 24 includes, for example, at least keys, buttons, a pointing device, a touch panel or the like and is used to input information. The display 25 is, for example, a liquid crystal display or the like and displays information and data.

The processor 21 is, for example a CPU (central processing unit) or the like. The processor 21 performs various processes by executing various kinds of programs stored in the storage device 22.

For example, the processor 21 performs a process of receiving product order information from the terminal 3 and deciding a fixed facility used for construction of a production line to produce products, and a process of deciding an installation position of mobile equipment to supplement a fixed facility. Further, the processor 21 performs a process of supplying an instruction to produce products (semi-manufactured products) in the fixed facility to a manager of the fixed facility and a process of transmitting (outputting) a request to transport mobile facility to a destination (an installation place) to the manager of the mobile facility.

<Terminal Configuration>

Figure 3:
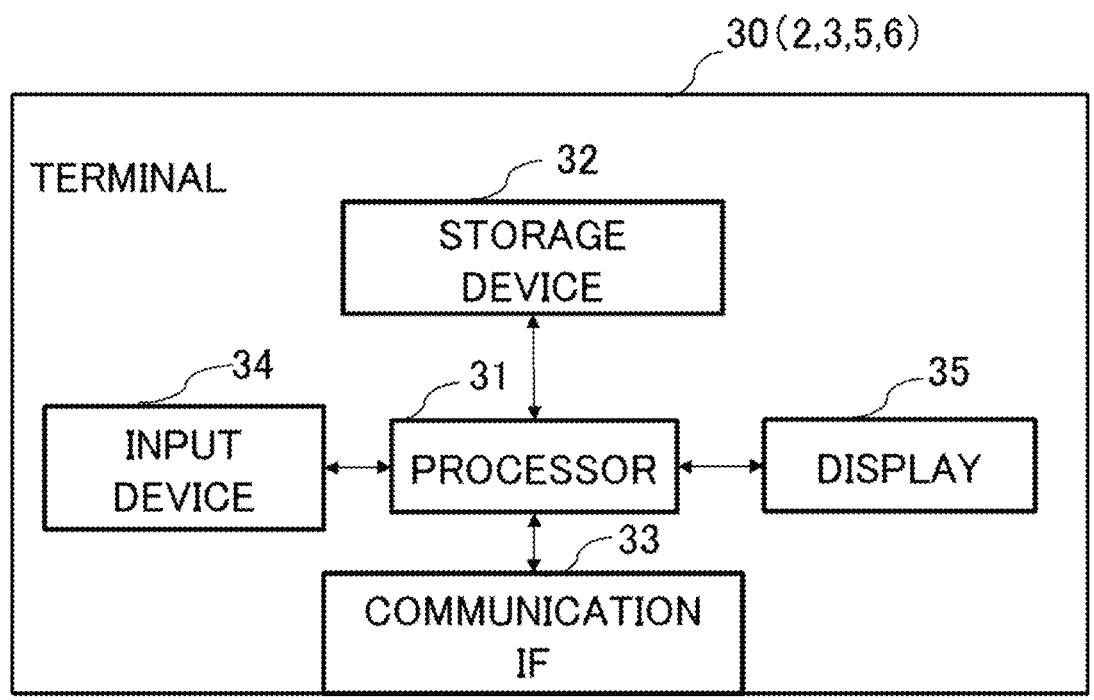
FIG. 3 illustrates a configuration example of a terminal apparatus that can be used as each of terminals illustrated in FIG. 1.

FIG. 3 illustrates a configuration example of a terminal apparatus 30 that can be used as each of the terminals 3 to 5 illustrated in FIG. 1. The terminal apparatus 30 may be, for example, a laptop personal computer or a smart device (such as a smartphone and a tablet terminal). The terminal apparatus 30 may be a portable terminal (a communication terminal including portability) such as a personal digital assistant (PDA) and a wearable computer. The terminal apparatus 30 may be a fixed terminal or a mobile terminal. Further, the terminal apparatus 30 may be a wireless terminal or a wired terminal. The terminal apparatus 30 may be a general-purpose information processing apparatus or a dedicated information processing apparatus. Further, the terminal apparatus 30 as the terminal 5 may be a wireless terminal that is carried by the driver of the vehicle 10 and brought into the vehicle 10 (placed on the vehicle 10) or a wireless terminal installed on the vehicle 10 (an onboard terminal).

The terminal apparatus 30 includes a processor 31, a storage device 32, a communication interface (a communication IF) 33, an input device 34 and a display 35. To the processor 31, the storage device 32, the communication IF 33, the input device 34 and the display 35, those similar to the processor 21, the storage device 22, the communication IF 23, the input device 24 and the display 25 can be applied, respectively. However, depending on the difference of a use, a use purpose and the like, those different from those applied to the server 2 in performance are applied. By executing various kinds of programs stored in the storage device 32, the processor 31 causes the terminal apparatus 30 to each of the terminals 3 to 5.

Note that, as each of the processor 21 and the processor 31, a plurality of CPUs may be applied, or a multi-core type CPU may be applied. At least a part of a process performed by the CPU may be performed by a processor other than the CPU, like a DSP (digital signal processor) or a GPU (graphical processing unit). Further, at least a part of the process performed by the CPU may be executed by a dedicated or general-purpose integrated circuit including an ASIC (application specific integrated circuit) and an FPGA (field programmable gate array), or a combination of a processor and the integrated circuit. The combination is called a microcontroller (MCU), SoC (System-on-a-chip), a system LSI, a chip set or the like. A part of a process performed by the processor 21 may be performed by the processor 31.

<Operation Example>

Figure 4:
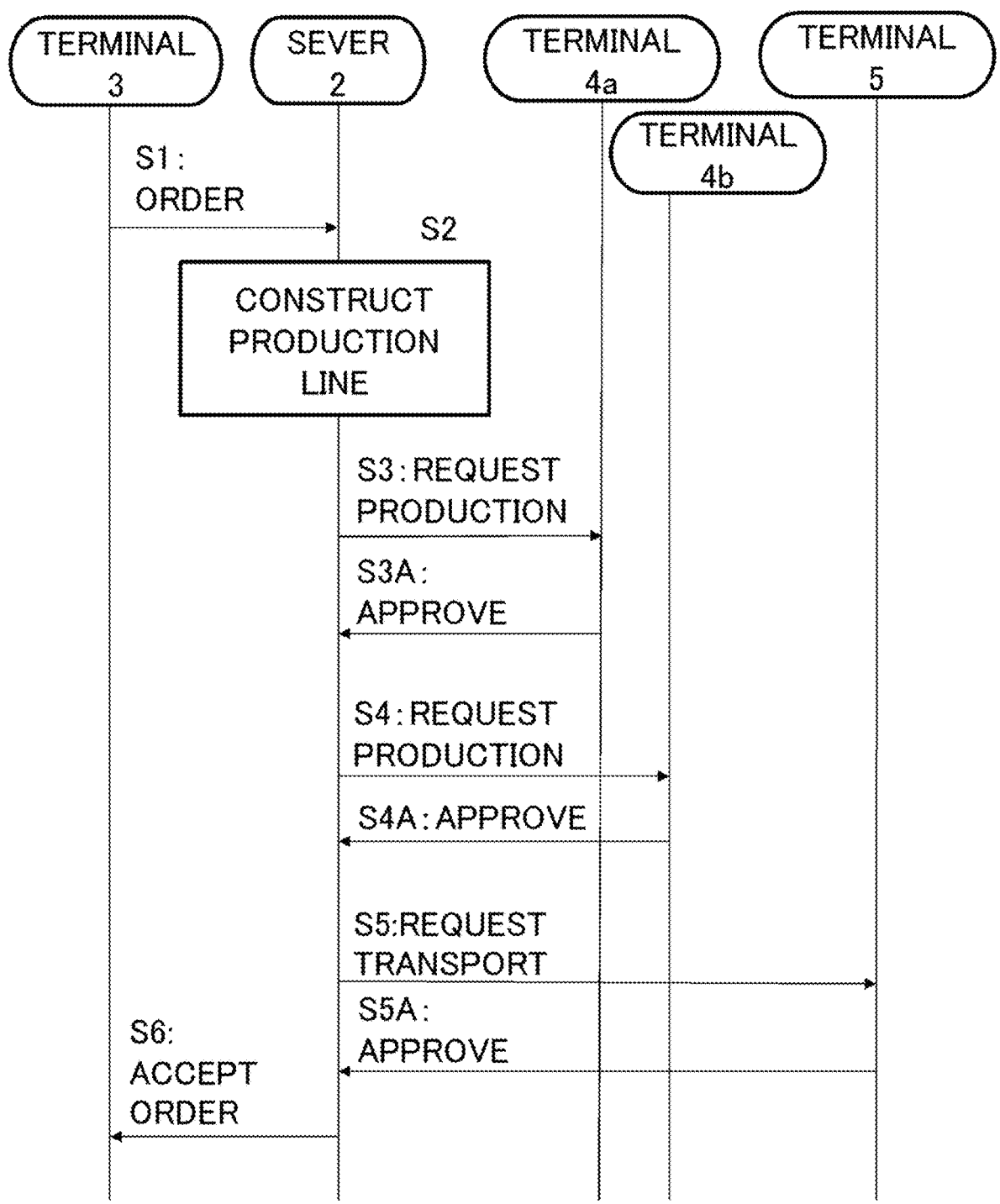
FIG. 4 is a sequence diagram illustrating an operation example of the information processing system.

An operation example of the information processing system will be described below. FIG. 4 is a sequence diagram illustrating the operation example of the information processing system. In FIG. 4, the terminal 3 of the orderer X transmits order information to the server 2 (step S1).

FIG. 5 illustrates a format example of the order information. The order information includes personal information about the orderer X (the name, identification number, contact address and the like of the orderer), information indicating products to be produced (produced articles), information indicating a quantity of products, information indicating a delivery deadline and intonation indicating a delivery place and a position of the delivery place.

The server 2 that receives the order information performs a production line construction process (step S2). The server 2 decides to construct a production line, for example, using the pieces of fixed equipment A and B located in the fixed facility F2, the piece of mobile equipment C' to be installed in the fixed facility F2, and the pieces of fixed equipment D and E located in the fixed facility F3 as illustrated in FIG. 1. In other words, the processor 21 assigns the plurality of pieces of equipment a to e used for the series of work processes to produce the products to the pieces of fixed equipment A and B, the piece of mobile equipment C' and the pieces of fixed equipment D and E.

The server 2 transmits a request to produce semi-manufactured products 15 using the pieces of fixed equipment A and B and the piece of mobile equipment C', information to the effect that the piece of mobile equipment C' is to be provided, and information including a quantity of products to be produced, a delivery deadline and the like to a terminal 4a of a manager Y1 of the fixed facility F2 (step S3). The server 2 receives a response to the effect that the request is approved, from the terminal 4a (step S3A).

The server 2 transmits a request to receive the semi-manufactured products 15 and produce products using the pieces of fixed equipment D and E, and information including the quantity of products to be produced and the delivery deadline, to a terminal 4b of a manager Y2 of the fixed facility F3 (step S4). The server 2 receives a response to the effect that the request is approved, from the terminal 4b (step S4A).

Further, the server 2 transmits a request to carry the piece of mobile equipment C' into the fixed facility F2, and information including a date and time of carrying in and a form of provision (provision of the piece of mobile equipment C' alone or provision of a mobile facility including the piece of mobile equipment C') to the terminal 5 of the manager Z of the mobile equipment (step S5). The server 2 receives a response approving the request from the terminal 5 (step S5A). The server 2 returns a response to the effect that the order is accepted, to the terminal 3 of the orderer X (step S6). The terminal 3 receives the information that the order has been accepted. Note that the order of steps S3, S4 and S5 can be appropriately changed.

Thus, the piece of mobile equipment C' is carried into the fixed facility F2, and a part of the production line using the pieces of fixed equipment A and B and the piece of mobile equipment C' is constructed in the fixed facility F2. Meanwhile, in the fixed facility F3, a part of the production line using the pieces of fixed equipment D and E is constructed. Thereby, it is possible to produce the quantity of products specified by the order information and deliver the products to a delivery place by the delivery deadline.

According to the information processing system, it becomes possible for the orderer X to, in the case of temporarily increasing production of products, receive the products produced by a new production line, by sending order information to the server 2. For the managers Y (Y1 and Y2), it is possible to perform production using unused equipment or equipment with a low operation rate, and obtain remuneration corresponding to the production. The manager Z of the mobile equipment can obtain remuneration by provision (lending or transfer) of mobile equipment. The manager of the server 2 can obtain a brokerage fee from the orderer X. A payer of the remuneration to the managers Y and Z can be, for example, at least one of the manager of the server 2 and the orderer X.

<Details of Production Line Construction Process>

Figure 6:
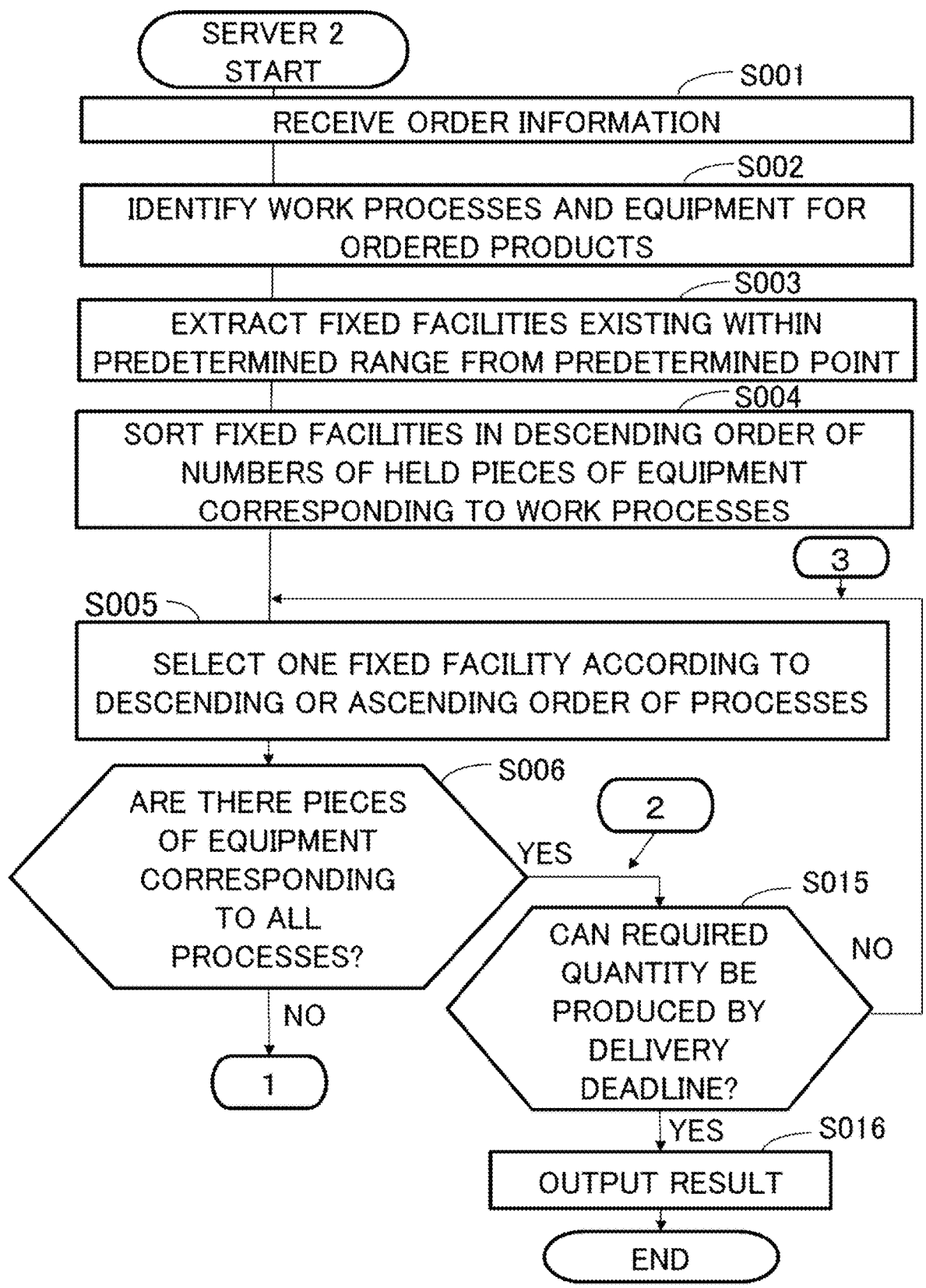
FIG. 6 is a flowchart illustrating an example of a production line construction process.
Figure 7:
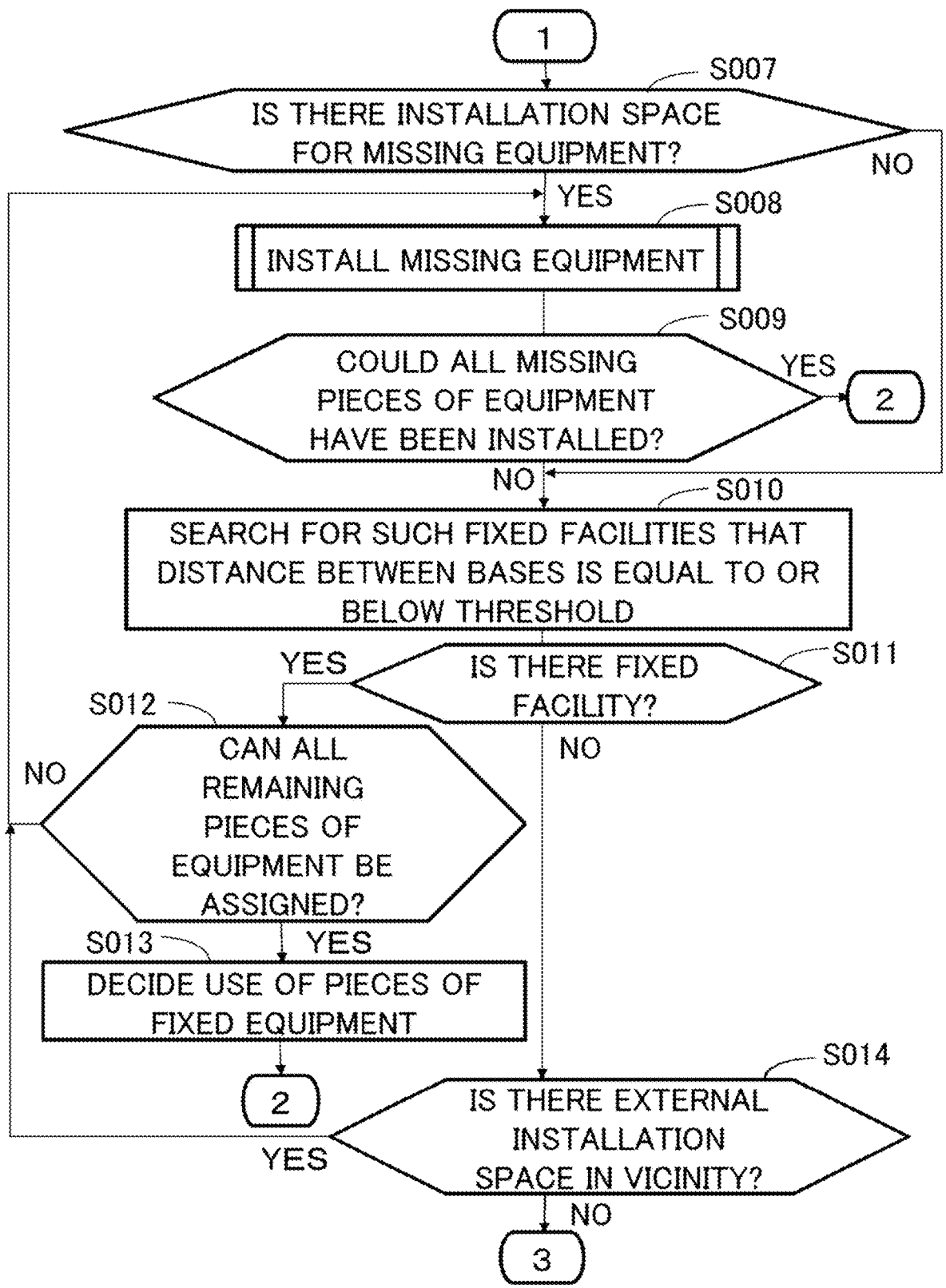
FIG. 7 is a flowchart illustrating the example of the production line construction process.

FIGS. 6 and 7 are flowcharts illustrating an example of the production line construction process (step S2). The process illustrated in FIGS. 6 and 7 is performed by the processor 21 of the server 2 executing a program.

At step S001, the processor 21 of the server 2 receives the order information via the communication IF 23. At step S002, the processor 21 refers to a production line information database (a production line information DB) stored in the storage device 22 to search for information indicating work processes and corresponding equipment that correspond to information indicating products which is included in the order information. The production line information DB may be stored in what is other than the storage device 22 as far as the processor 21 can access it.

FIG. 8 illustrates a data structure example of the production line information DB. The production line information DB is configured with a plurality of entries. Each entry includes information indicating work processes and information indicating corresponding equipment, which are related to the information about the products. The information indicating work processes indicates a plurality of work processes required for production of the products, and the information indicating corresponding equipment indicates a plurality of pieces of equipment used in each of the series of the plurality of work processes. Though, in the present specification, an example in which one piece of equipment is used for one process is indicated for simplification, two or more pieces of equipment may be used for one process. Here, production capacity indicates the maximum quantity of products that can be produced per unit time using a production line; an operation rate indicates a rate of production being actually performed; and a quantity of production per unit time can be determined by "production capacity multiplied by operation rate".

For example, work processes for producing products "PD1" include five work processes ST1, ST2, ST3, ST4 and ST5. Order of the work processes (descending order) is ST1→ST2→ST3→ST4→ST5. The piece of equipment a is used in the work process ST1; the piece of equipment b is used in the work process ST2; and the piece of equipment c is used in the work process ST3. Further, the piece of equipment d is used in the work process ST4, and the piece of equipment e is used in the work process ST5.

At step S002, by detecting an entry corresponding to the information indicating the products (identification information) in the order information from the production line information DB, the processor 21 acquires the information indicating the work processes for producing the products and the information indicating corresponding equipment.

At step S003, the processor 21 performs a process for extracting fixed facility existing within a predetermined range from a predetermined point. The predetermined point is, for example, a position of a delivery place. However, the predetermined point may be a position other than the position of the delivery place. For example, the predetermined point may be an appropriate position (a central position of a range to roughly search for pieces of fixed equipment) decided by the orderer X or the manager of the server 2. The predetermined range defines a geographical area where fixed facilities are to be searched for. For example, the predetermined range is a circular range defined by a radius with a predetermined length, with the predetermined point as the center. Or alternatively, the predetermined range is a range where the length of a route (a road) from the predetermined point is a predetermined length, or the like. The predetermined range becomes the geographical area.

At step S003, the processor 21 sets the position of the delivery place included in the order information as the predetermined point and sets a range with a radius "n" [km] from the position of the delivery place as the geographical area. Then, the processor 21 detects (extracts) information about fixed facilities existing within "n" km from the position of the delivery place from a fixed facility database (a fixed facility DB).

FIG. 9 illustrates a data structure example of the fixed facility DB. The fixed facility DB is configured with a set of small tables prepared for fixed facilities, respectively. Each of the small tables includes information indicating a position of a fixed facility, information indicating pieces of fixed equipment located in the fixed facility and information indicating an installation space for mobile equipment.

The information indicating the pieces of fixed equipment are managed by entries for the pieces of fixed equipment. Each entry includes identification information about a piece of fixed equipment, information indicating a corresponding work process, information indicating specifications of the piece of fixed equipment (including a size, a weight, performance and the like), information indicating an amount of processing (an amount of work per unit time) and information indicating an occupancy rate (%) of other uses. The information indicating an installation space includes, for example, the size of the installation space and information indicating a form of provision (provision of a piece of mobile equipment alone or provision of a mobile facility provided with the piece of mobile equipment). Or alternatively, the information indicating an installation space may be information indicating mobile equipment or mobile facilities that can be installed in the installation space.

At step S004, the processor 21 sorts the fixed facilities extracted at step S003 in descending order about the numbers of held pieces of fixed equipment corresponding to the work processes (the numbers of pieces of fixed equipment located in the fixed facilities). When the numbers of held pieces of fixed equipment are the same, the processor 21 performs sorting in order of closeness from the predetermined point with the closest position at the top. However, a method other than the above may be used.

At step S005, one fixed facility is selected according to descending or ascending order of the work processes. The descending order refers to order from the first to the last of the work processes, and the ascending order refers to order from the last to the first of the work processes. Which of the descending order and the ascending order is to be set can be appropriately set by the operator of the server 2.

For example, when the descending order is set, the processor 21 extracts small tables of fixed facility where equipment corresponding to the first process is located, from the fixed facility DB and selects a fixed facility with the largest number of pieces of corresponding equipment. The processor 21 assigns the plurality of pieces of equipment used for the series of work processes to the fixed equipment located in the fixed facility selected at step S005. Note that, when there is not a fixed facility where the first piece of equipment (for example, a piece of fixed equipment A) is located, at step S005, a fixed facility where the next piece of equipment (a piece of fixed equipment B) is located is selected.

At step S006, the processor 21 judges whether or not a plurality of pieces of fixed equipment to which all the plurality of pieces of equipment used for the series of work processes for producing the products can be assigned are located in the fixed facility selected at step S005. When it is judged that the pieces of fixed equipment to which all the plurality of pieces of equipment can be assigned exist, the process proceeds to step S015. Otherwise, the process proceeds to step S007 (FIG. 7).

At step S007, the processor 21 judges whether or not there is an installation space for missing equipment (assignment-destination equipment of unassigned equipment) in the fixed facility selected at step S005. The judgment at step S007 is made by whether or not information to the effect that there is an installation space is registered with the small table for the fixed facility selected at step S005. When it is judged that an installation space exists, the process proceeds to step S008. Otherwise, the process proceeds to step S010.

Figure 10:
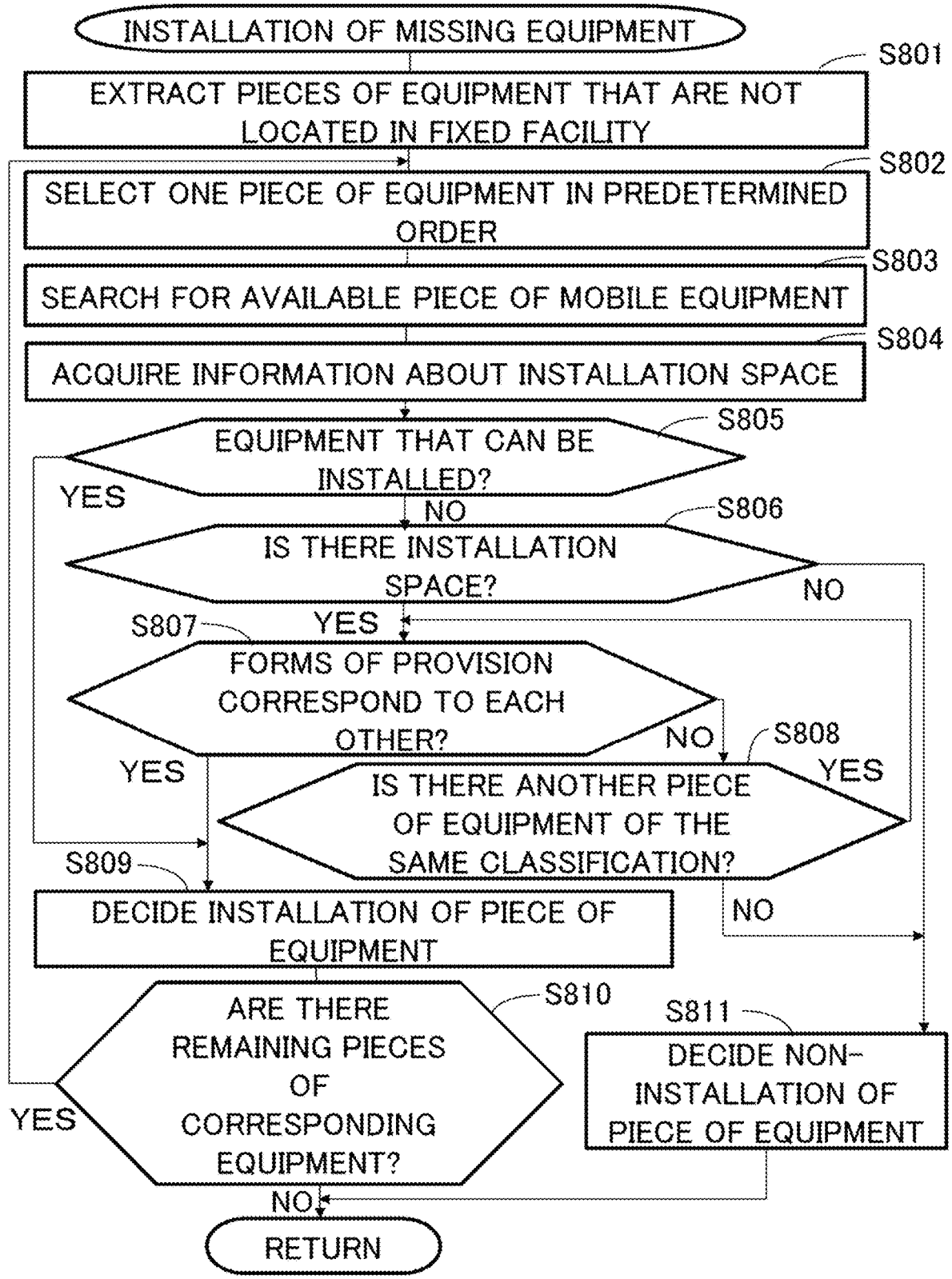
FIG. 10 is a flowchart illustrating an example of a subroutine of a process for deciding installation of missing equipment.
Figure 14A:
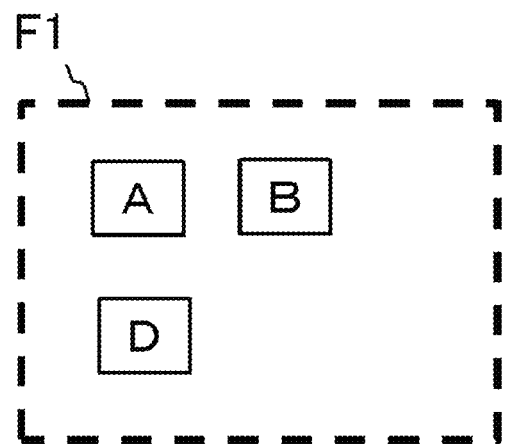
FIGS. 14A and 14B are explanatory diagrams of a first process example.
Figure 14B:
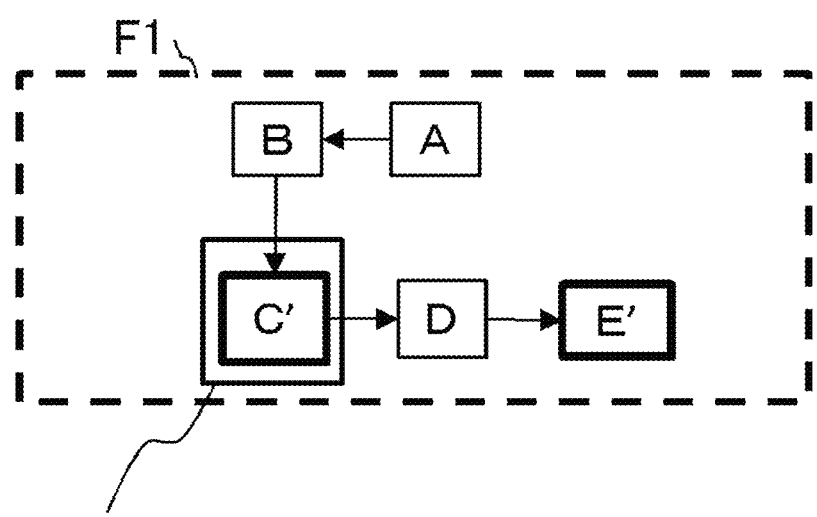

At step S008, the processor 21 performs a process of deciding installation of missing equipment in predetermined order (for example, descending order). FIG. 10 is a flowchart illustrating an example of a subroutine of the process for installing missing equipment.

At step S801, the processor 21 compares the information indicating the pieces of corresponding equipment for the products and information indicating the pieces of equipment owned by the fixed facility to extract pieces of equipment that are not located in the fixed facility (corresponding to the unassigned pieces of equipment). At step S802, the processor 21 selects one piece of equipment from the extracted pieces of equipment in predetermined order (descending order).

At step S803, the processor 21 refers to the mobile equipment database (DB) stored in the storage device 22 to search for an available piece of mobile equipment. The mobile equipment DB may be stored in what is other than the storage device 22 as far as the processor 21 can access the mobile equipment DB and acquire desired information.

FIG. 11 illustrates a data structure example of the mobile equipment DB. The mobile equipment DB is configured with one or more entries prepared for pieces of mobile equipment, respectively. Each entry includes information indicating a classification, a status, a position, specifications, an amount of processing and a form of provision of a piece of mobile equipment corresponding to identification information (ID).

The status indicates whether the piece of mobile equipment is currently used or unused. The position information indicates a current position of the piece of mobile equipment. The specifications indicates specifications (including a size, a weight, performance and the like) of the piece of mobile equipment. The amount of processing indicates an amount of work of the piece of mobile equipment per unit time. The form of provision indicates whether the piece of mobile equipment is provided alone or provided together with a mobile facility. The information indicating specifications also includes the size, weight and the like of a mobile facility in the case where the piece of mobile equipment is provided together with the mobile facility.

The processor 21 extracts an entry that includes an equipment classification that corresponds to that of the piece of equipment selected at step S802, from the mobile equipment DB. At this time, when two or more entries of pieces of equipment of the same classification (entries of classification C) are registered with the mobile equipment DB as illustrated in FIG. 11, priority is decided based on a predetermined rule to select one entry. For example, using the information indicating the position in each entry, an entry with a shorter distance to the fixed facility is preferentially selected.

At step S804, the processor 21 acquires installation space information about a fixed facility F1 from the fixed facility DB. At step S805, the processor 21 judges whether or not the installation space information indicates that the piece of mobile equipment can be installed. In other words, the processor 21 judges whether or not the installation space information includes information specifically indicating pieces of equipment that can be installed, and the piece of mobile equipment in the entry selected from the mobile equipment DB is included among the pieces of equipment that can be installed. When it is judged that it is indicated that the piece of mobile equipment can be installed, the process proceeds to step S809. Otherwise, the process proceeds to step S806. When the information specifically indicating the pieces of equipment that can be installed is not included in the installation space information at step S804, the process proceeds to step S806.

At step S806, the processor 21 judges whether or not there is an installation space to install the piece of mobile equipment. For example, the processor 21 compares the size of the installation space included in the installation space information with the size of the piece of mobile equipment in the entry selected from the mobile equipment DB to judge whether the size of the installation space is larger or not. At this time, when it is judged that the installation space exists, the process proceeds to step S807. When it is judged otherwise, the process proceeds to step S811.

At step S807, the processor 21 judged whether a form of provision in the installation space information and the form of provision of the piece of mobile equipment correspond to each other. At this time, when it is judged that the forms of provision correspond to each other, the process proceeds to step S809. Otherwise, the process proceeds to step S808.

At step S808, the processor 21 judges whether or not there is an entry for another piece of equipment of the same classification in the mobile equipment DB. When it is judged that there is an applicable entry, the process returns to step S807. Otherwise, the process proceeds to step S811.

At step S809, the processor 21 decides to install the piece of mobile equipment in the installation space. As the piece of mobile equipment, the piece of equipment selected at step S802 (a piece of corresponding equipment: one of the plurality of pieces of equipment used for the series of work processes) is assigned to the piece of mobile equipment identified by the entry selected at step S803.

At step S810, the processor 21 judges, for the pieces of fixed equipment, whether or not there are remaining pieces of corresponding equipment for which it is to be judged whether installation is possible or not. When it is judged that there are remaining pieces of corresponding equipment, the process returns to step S802. When it is judged that there are not remaining pieces of corresponding equipment, the subroutine of the process for installing missing equipment ends, and the process proceeds to step S009 of the main routine.

When the process proceeds to step S811, the processor 21 decides not to install the piece of equipment selected at step S802 in the fixed facility. In this way, for the fixed facility selected at step S005, the pieces of mobile equipment to which the pieces of corresponding equipment are to be assigned are installed in the predetermined order as far as there is installation space; and, when there is no more installation space, non-installation of pieces of corresponding equipment after that is decided.

At step S009, the processor 21 judges whether or not all the missing pieces of equipment have been installed in the fixed facility as a result of step S008. When installation of all the pieces of corresponding equipment has been decided at step S008, the process proceeds to step S015 (FIG. 6). On the other hand, when non-installation of all or a part of the pieces of corresponding equipment has been decided at step S008, the process proceeds to step S010.

At step S010, the processor 21 searches for fixed facilities satisfying a condition that a distance between fixed facilities is equal to or below a threshold, from the fixed facility DB. The distance between fixed facilities is calculated using pieces of position information about two fixed facilities. The distance between fixed facilities may be registered with the fixed facility DB in advance.

At step S011, the processor 21 judges whether a fixed facility satisfying the condition of step S010 has been found or not. At this time, when it is judged that a fixed facility satisfying the condition has been found, the process proceeds to step S012. Otherwise, the process proceeds to step S014.

At step S012, the processor 21 judges whether all the remaining pieces of corresponding equipment can be assigned to the fixed facility detected at step S011 or not. In other words, the processor 21 judges whether pieces of fixed equipment to which all the remaining pieces of corresponding equipment can be assigned are located in the fixed facility or not. At this time, when it is judged that all the remaining pieces of corresponding equipment can be assigned, the process proceeds to step S013. Otherwise, the process returns to step S008.

At step S013, the processor 21 decides assignment of the remaining pieces of corresponding equipment to the pieces of fixed equipment (selects the pieces of fixed equipment as pieces of fixed equipment to be used for production) and advances the process to step S015.

At step S014, the processor 21 judges whether or not there is an external installation space in the vicinity of the fixed facility (within a predetermined distance from the position of the fixed facility). The external installation space is not a production facility like a fixed facility but refers to an available place or a piece of land that is available as a temporary production space, including a vacant space, a warehouse and the like. In the process of step S014, information stored in an external installation space database (an external installation space DB) is used. FIG. 12 illustrates a data structure example of the external installation space database (the external installation space DB). The external installation space DB is configured with entries for respective external installation spaces, and each entry includes identification information about an external installation space, information about a position, and information indicating equipment that can be installed in the external installation space or a classification of the equipment.

At step S014, the processor 21 determines direct distances between the position of the fixed facility and the external installation spaces to judge whether the distances are within the predetermined distance or not. When it is judged that there is an external installation space within the predetermined distance, the process proceeds to step S008. Otherwise, the process returns to step S005.

That the process returns from step S014 to step S005 means that the full length of the production line cannot be kept within a predetermined length. At step S005, reselection of a fixed facility where equipment to be a start point or an end point of the production line is located is performed. Therefore, assignment about the "plurality of pieces of equipment" to the pieces of fixed equipment and the pieces of mobile equipment performed so far is released (reset).

When the process proceeds to step S008 after step S014, the processor 21 performs the following process at step S805. Each of external installation spaces existing within the predetermined distance from the fixed facility is decided as a candidate for a mobile equipment installation place, and an installation-target piece of mobile equipment is searched for (steps S802 and S803). Then, a judgment about whether the detected piece of mobile equipment can be installed in each of the external installation spaces or not is made at step S805.

At step S805, the processor 21 makes the judgment, referring to intonation indicated as "installable equipment" stored in an external installation space DB. For example, when the installation-target piece of equipment is the "piece of equipment C", the processor 21 judges whether information indicating the "piece of equipment C" is included in the information indicated as "installable equipment". When it is judged that information about the piece of equipment is included, the processor 21 decides installation of the piece of mobile equipment in the external installation space (S809). On the other hand, when the information about the piece of equipment is not included, the processor 21 makes a judgment of NO at step S806 and decides non-installation of the piece of equipment (S811). At step S010, the position of the external installation space is used as a position of one base at the time of calculating a distance between bases.

When the process proceeds to step S015, the processor 21 judges whether or not production of the requested quantity of products is possible by the delivery deadline. In other words, the processor 21 judges whether or not it is possible to produce the requested quantity of products by the delivery deadline in the order information, using the constructed production line.

The processor 21 refers to the production line information DB and determines a quantity of production per unit time from production capacity and an operation rate corresponding to the production line. At this time, there may be a case where the production line is constructed across a plurality of bases, distances among the bases are long, and it is necessary to consider time required for transport (transport time). In consideration of such a case, a coefficient k is determined using a table of correspondence between distances or transport time and the coefficient k. The larger the distance or the transport time is, the smaller the value of the coefficient k is.

FIG. 13 illustrates a data structure example of the correspondence table. The correspondence table is stored in the storage device 22 or what is other than the storage device 22 the processor 21 can access. The correspondence table stores a correspondence relationship between a distance d (d1, d2, . . . , dn−1, dn) between fixed facilities or transport time t (t1, t2, . . . , tn−1, tn) and the value of the coefficient k (0<k=<1). FIG. 13 illustrates the relationship the distance and the coefficient. When there are three or more fixed facilities, a total value of distances d or transport times t between facilities is used as the distance d or the transport time t. The discrete width of the coefficient k (the number n of distances or transport times) can be appropriately set.

The processor 21 multiplies the production capacity, the operation rate, or a product of the production capacity and the operation rate (the quantity of production per unit time) by the coefficient k determined using the correspondence table. For example, when all the pieces of equipment are installed in one fixed facility, the value of the coefficient k is 1. In the present embodiment, a case is assumed where pieces of equipment of the same type include the same production capacity (the amount of processing), and each piece of equipment is not used for other purposes (the occupancy rate of other purposes is 0%) for simplification of the description. In the case of pieces of equipment of the same type including different production capacities, however, a configuration can be made so that a piece of equipment with a higher production capacity is preferentially selected. Further, when a part of the pieces of equipment forming the production line are used for other purposes, a value lower than the initial value of the operation rate may be used for calculation of the quantity of production according to time during which the part of the pieces of equipment are used for the other purposes.

When it is judged at step S015 that the required quantity can be produced by the delivery deadline, the process proceeds to step S016. Otherwise, the process returns to step S005. In this case, at step S005, construction of an additional production line (corresponding to the second production line) different from the constructed production line (corresponding to the first production line) is performed.

At step S016, the processor 21 outputs production request information to the manager Y of each fixed facility and request information to the manager Z of the mobile equipment based on the constructed production line(s). When step S016 ends, the main routine ends.

Note that, in the description using FIG. 7, the process of step S010 is performed when a judgment of NO is made in the process of step S009. However, the process of step S014 may be executed first; and, when a judgment of NO is made, the process may proceed to step S010. Or alternatively, such fixed facilities and external installation spaces that a distance from the current fixed facility or external installation space is equal to or below a threshold may be searched for so that a fixed facility or external installation space with a shorter distance from the current fixed facility or external installation space is adopted.

<First Process Example>

Next, a first process example of the production line construction process of the server 2 will be described. FIGS. 14A and 14B, FIGS. 15A, 15B and 15C, and FIG. 16 are explanatory diagrams of the first process example. Produced articles (products) specified by order information in the first process example are the products "PD1". In this case, the production processes ST1, ST2, ST3, ST4 and ST5 for the products PD1 are identified, and the pieces of equipment a, b, c, d and e are identified as corresponding equipment according to registered content of the production line information DB (S002).

It is assumed that the fixed facility DB includes the registered content illustrated in FIG. 9. In this case, at the first step S005 after the processes of steps S003 and S004, the fixed facility F1 including the piece of fixed equipment A corresponding to the first process ST1 and including three pieces of corresponding equipment, the largest number of pieces of corresponding equipment, is selected.

When the fixed facility F1 is selected at step S005, the pieces of equipment a, b and d among the plurality of pieces of equipment a to e used for the series of work processes are assigned to the pieces of fixed equipment A, B and D located in the fixed facility F1. However, the pieces of fixed equipment C and E, to which the pieces of equipment c and e corresponding to the work processes ST3 and ST5 are to be assigned, are not located in the fixed facility F1 (see FIG. 14A). The pieces of equipment c and e at this time correspond to unassigned pieces of equipment. The processor 21 makes a judgment of NO at step S006 and advances the process to step S007.

When the pieces of mobile equipment C' and E' can be installed in the fixed facility F1 as the pieces of equipment c and e, which are unassigned pieces of equipment (the pieces of equipment c and e can be assigned to the pieces of mobile equipment C' and E'), installation of the pieces of mobile equipment C' and E' is decided at the process of step S008. At this time, it is decided that the form of provision of the piece of mobile equipment C' is "mobile facility", and the form of provision of the piece of mobile equipment E' is "equipment alone". Thereby, the piece of mobile equipment C' accommodated in a mobile facility and the piece of mobile equipment E' alone are installed in the fixed facility F1 to construct a production line (see FIG. 14B).

Since the pieces of fixed equipment and the pieces of mobile equipment to which all the pieces of equipment a to e corresponding to the work processes ST1 to ST5 are located in the fixed facility F1, the process proceeds from step S009 to S015. At step S015, when the quantity of products included in the order information can be produced by a delivery deadline by the production line in the fixed facility F1, the production line construction process ends.

On the other hand, when the quantity of production is insufficient, the process returns to step S005, and construction of an additional (second) production line is performed. At this time, entries for the pieces of fixed equipment and pieces of mobile equipment used for construction of the production line, in the fixed equipment DB and the mobile equipment DB are masked and are temporarily in an unusable state.

It is assumed that the fixed facility F2 is selected in the process of step S005 performed second time. The fixed facility F2 includes the pieces of fixed equipment A and B and includes none of the pieces of fixed equipment C, D and E (See FIG. 15A). In this case, it is decided in the process of step S008 that the piece of mobile equipment C' is to be installed in the fixed facility F2. However, it is decided that the piece of mobile facility D' cannot be installed.

In this case, the process proceeds to step S010 after step S009. It is assumed that the fixed facility F3 the distance d of which from the fixed facility F2 is equal to or below a threshold Th (within a predetermined distance) is found at step S010 (see FIG. 15B). In this case, the process proceeds to step S012.

The fixed facility F3 includes the pieces of fixed equipment D and E. Therefore, it is decided to use the pieces of fixed equipment D and E for construction of the production line (assign the pieces of equipment d and e) by the processes of steps S012 and S013. Then, the second production line is constructed by the pieces of fixed equipment A and B of the fixed facility F2, the piece of mobile equipment C' installed in the fixed facility F2, and the pieces of fixed equipment D and E of the fixed facility F3 (see FIG. 15C).

When the ordered quantity of products can be produced by the first production line constructed in the fixed facility F1 and the second production line constructed in fixed facilities F2 and F3, the production line construction process ends. Thereby, it becomes possible to produce the products PD1 by each of the first production line and the second production line, and deliver the products PD1 to a warehouse 16 which is a delivery place.

<<Second Process Example>>

Figure 15A:
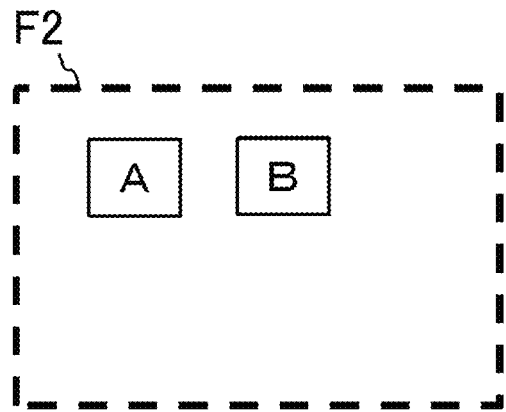
FIGS. 15A, 15B and 15C are explanatory diagrams of the first process example.
Figure 15B:
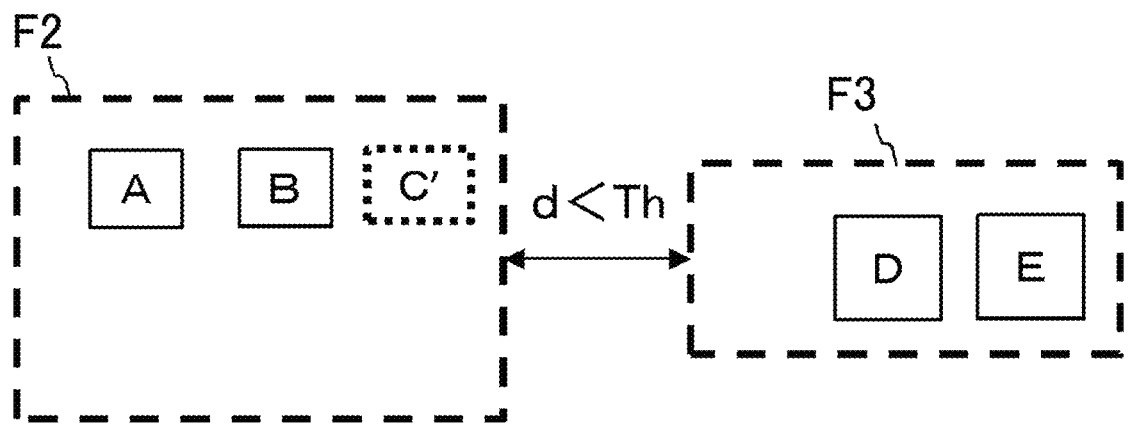
Figure 15C:
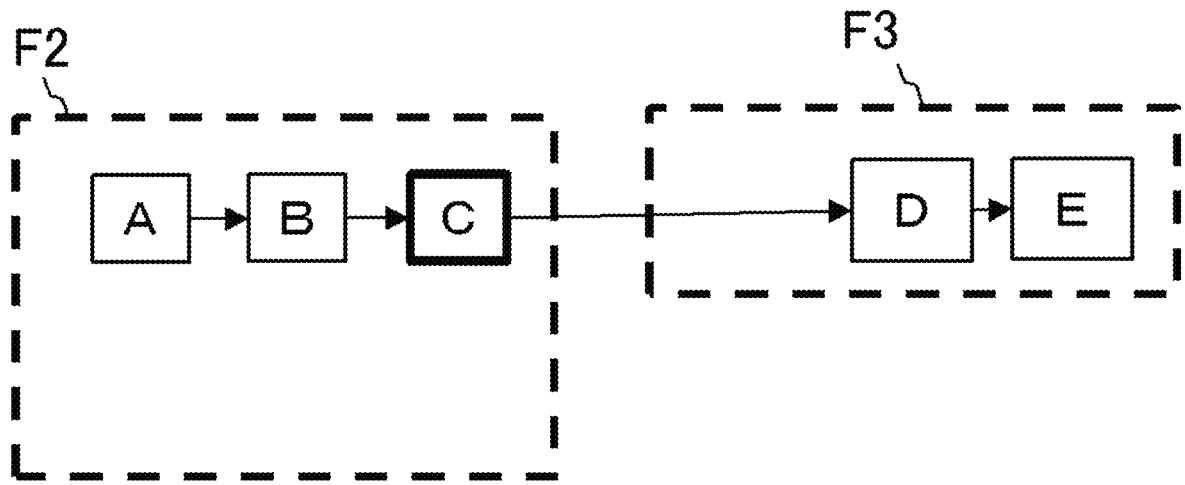
Figure 16:
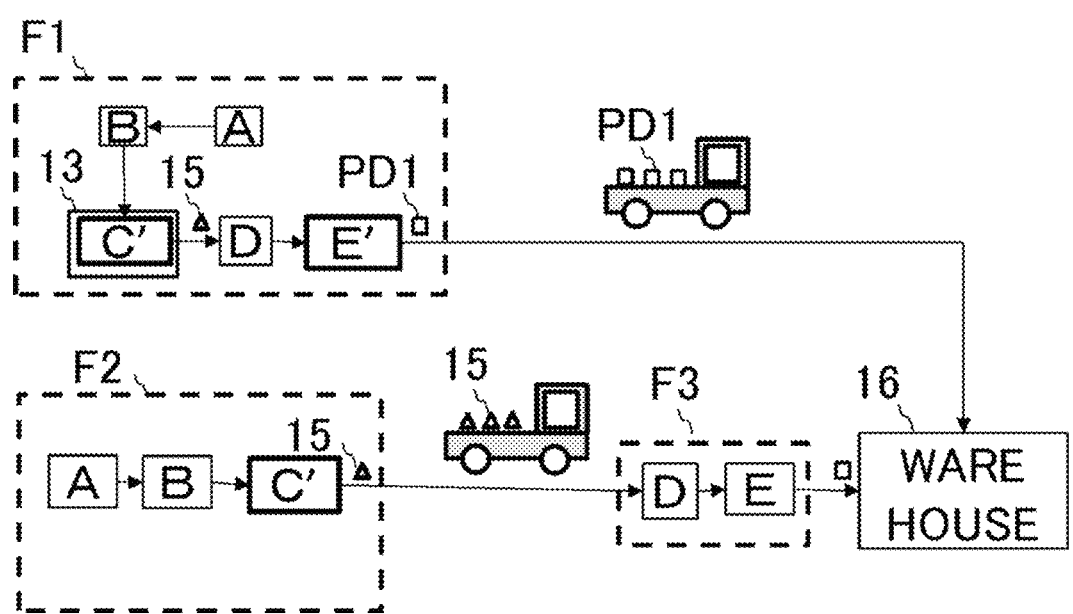
FIG. 16 is an explanatory diagram of the first process example.
Figure 17A:
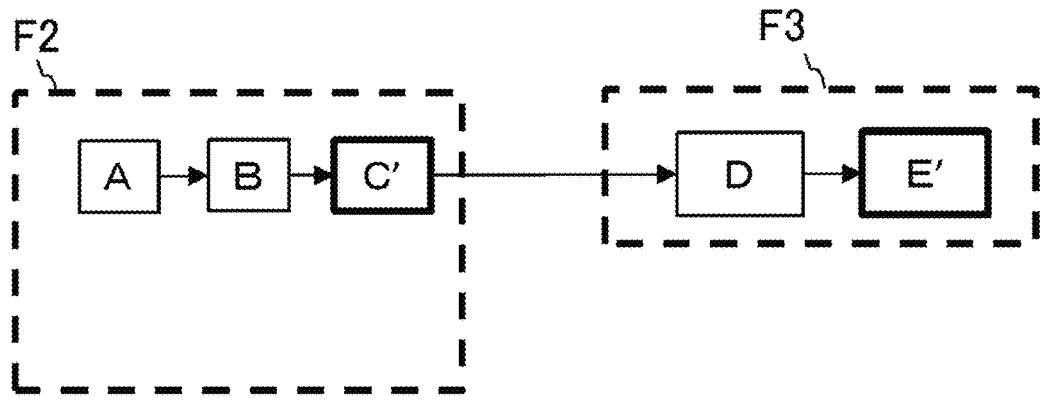
FIG. 17A illustrates a production line by a second process example.

It is assumed that, though the piece of fixed equipment D exists in the fixed facility F3, the piece of fixed equipment E does not exist, unlike the situation illustrated in FIG. 15B according to the first process example. In this case, for the fixed facility F3, a judgment about whether the piece of mobile equipment E' can be installed or not is made at step S008. When the piece of mobile equipment E' can be installed in the fixed facility F3, a production line with the mobile equipment E' installed in the fixed facility F3 is constructed. FIG. 17A illustrates the production line according to the second process example.

<<Third Process Example>>

Figure 17B:
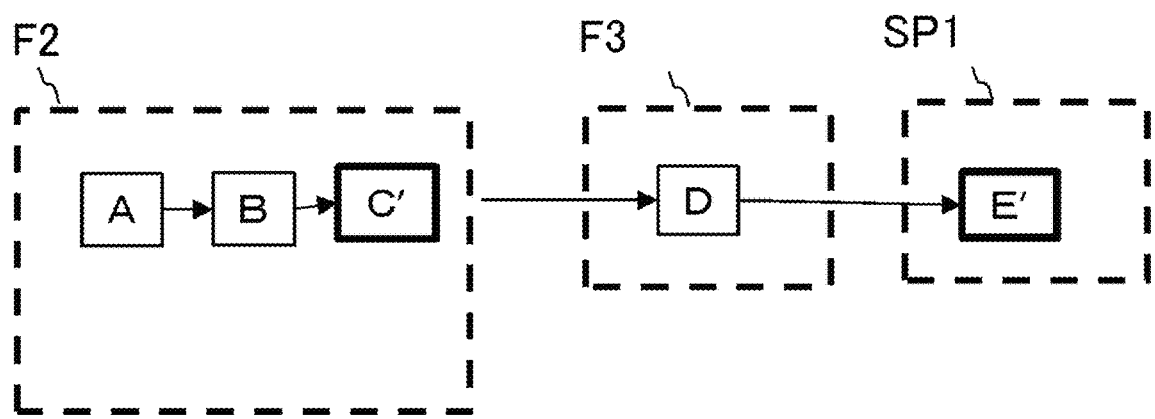
FIG. 17B illustrates a production line by a third process example.

It is assumed that it is judged at step S008 that the piece of mobile facility E' cannot be installed in the fixed facility F3, unlike the second process example. In this case, external installation spaces in the vicinity of the fixed facility F3 are searched for (step S014). It is assumed that, at this time, an external installation space SP1 is found, and the piece of mobile equipment E' can be installed in the external installation space SP1. In this case, the second production line using the piece of mobile equipment E' installed in the external installation space SP1 is constructed. FIG. 17B illustrates the second production line according to the third process example.

<<Fourth Process Example>>

Figure 17C:
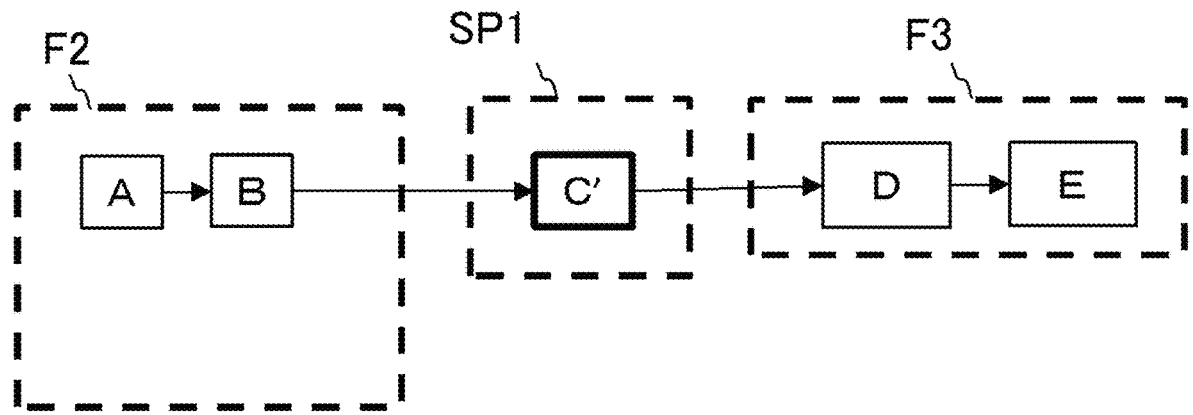
FIG. 17C illustrates a production line by a fourth process example.

There may be a case where, unlike the first process example, all missing pieces of equipment cannot be installed in the fixed facility F2, a case where the piece of mobile equipment C' cannot be installed in the fixed facility F2, or a case where a fixed facility where the piece of fixed equipment C is located does not exist within the predetermined distance from the fixed facility F2. In these cases, the piece of mobile equipment C' may be installed in an external installation space existing in the vicinity of (within the predetermined distance) the fixed facility F2 (for example, SP1) so that the piece of mobile equipment C' is connected to the piece of fixed equipment D in the fixed facility F3 existing in the vicinity of (within the predetermined distance) the external installation space SP1 (see FIG. 17C).

<Effects of the Embodiment>

According to the embodiment, it is possible to construct a production line for producing the ordered quantity of products by fixed equipment existing in a geographical area, or by fixed equipment existing in the geographical area and mobile equipment installed in the geographical area. Since the production line is constructed so that a distance between bases is within a predetermined distance, it is possible to avoid the production line from being too long, and it is possible to efficiently perform production. Further, since a quantity of production per unit time in consideration of the distance between bases is calculated, and an additional production line is constructed when one production line is not enough, it is possible to produce and deliver the requested quantity of products by a delivery deadline.

<Others>

The embodiment described above is a mere example, and the present disclosure can be practiced by being appropriately changed within a range not departing from the spirit thereof.

Further, a process described as being performed by one apparatus may be shared and executed by a plurality of apparatuses, or a process described as being performed by different apparatuses may be executed by one apparatus. In a computer system, by what hardware configuration (server configuration) each function is realized can be flexibly changed.

The present disclosure can be realized by supplying a computer program in which the functions described in the above embodiment are implemented to a computer, and one or more processors that the computer includes reading out and executing the program. Such a computer program may be provided to the computer by a non-transitory computer-readable storage medium connectable to a system bus of the computer or may be provided to the computer via a network. The non-transitory computer-readable storage medium is, for example, a disk of an arbitrary type such as a magnetic disk (including a floppy (registered trademark) disk, a hard disk drive (HDD) and the like) and an optical disk (including a CD-ROM, a DVD disk, a Blu-ray Disc and the like). As the non-transitory computer-readable storage medium, for example, a read-only memory (ROM), a random access memory (RAM), an EPROM, an EEPROM, a magnetic card, a flash memory, an optical card, and a medium of an arbitrary type that is suitable for storing electronic commands are included.

What is claimed is:

1. An information processing method comprising:
receiving by a processor order information including information indicating products to be produced, information indicating a quantity of the products, information indicating a delivery deadline and information indicating a position of a delivery place via a communication interface; referring by the processor to a production line information database storing information about a production line for producing the products based on the information indicating products to be produced, and acquiring a series of work processes about the production line, pieces of corresponding first equipment required for the series of work processes and a quantity of production based on production capacity and an operation rate using the production line;
referring by the processor to a fixed facility database storing information about a fixed facility, and acquiring pieces of first equipment that can be assigned to the series of work processes, a fixed facility to which the pieces of first equipment belong, a position of the fixed facility, and a size of an installation space of pieces of mobile second equipment in the fixed facility, for a fixed facility existing within a predetermined distance from the position of the delivery place;
selecting by the processor any of a plurality of fixed facilities in descending order about numbers of pieces of first equipment which can be assigned to the series of work processes and located in each of the plurality of fixed facilities, and trying to assign a plurality of pieces of first equipment located in the any of the plurality of fixed facilities to the series of work processes based on information indicating the plurality of pieces of first equipment located in a geographical area and information indicating respective positions about the plurality of pieces of first equipment;
judging by the processor that a first fixed facility selected from the plurality of fixed facilities includes an installation space for the pieces of second equipment though pieces of first equipment which can be assigned to all the series of work processes are not located in the first fixed facility, in response to judging that the first fixed facility includes the installation space for the pieces of second equipment though the pieces of first equipment which can be assigned to all the series of work processes are not located in the first fixed facility, referring to a mobile equipment database storing information on a size of the pieces of second equipment, extracting available pieces of second equipment from the mobile equipment database, comparing the size of the installation space with the size of the second equipment extracted from the mobile equipment database, judging whether the size of the installation space is larger than the size of the pieces of second equipment, and deciding installation of the pieces of second equipment to be assigned to the installation space in response to the size of the installation space being judged to be larger than the size of the pieces of second equipment;
transmitting by the processor request information to transport the pieces of second equipment by a transport vehicle to an installation position in the geographical area to a terminal of a manager of the pieces of second equipment via the communication interface;

calculating by the processor a quantity of production of the products per unit time by a production line using the pieces of first equipment and the pieces of second equipment which are assigned to the series of work processes, in response to assignment about the pieces of first equipment and the pieces of second equipment to all the series of work processes ending;

multiplying by the processor the quantity of production of the products per unit time by a coefficient determined using a table of correspondence between the coefficient and a distance or transport time between bases including a fixed facility and an external installation space, determining a quantity of products requested to be delivered by the deadline being not produced with the quantity of production of the products per unit time multiplied by the coefficient, deciding by the processor construction of an additional production line using the plurality of pieces of first equipment, and the pieces of second equipment received from the transport vehicle, in response to determining the quantity of the products requested to be delivered by the deadline being not produced with the quantity of production of the products per unit time multiplied by the coefficient; and causing the construction of the additional production line based on the construction decision.

2. The information processing method according to claim 1, wherein, in response to the size of the installation space being judged to be smaller than the size of the pieces of second equipment, a second fixed facility existing within a predetermined distance from the first fixed facility is searched for, and unassigned pieces of first equipment located in the second fixed facility are assigned to the series of work processes.

3. The information processing method according to claim 1, wherein, in response to the size of the installation space being judged to be smaller than the size of the pieces of second equipment, installation of the pieces of second equipment to be assigned to unassigned processes in an external installation space within a predetermined distance from the first fixed facility is decided.

4. The information processing method according to claim 1, wherein the geographical area is a circular area with a predetermined radius, with a predetermined point as a center.

5. The information processing method according to claim 4, wherein the predetermined point is the position of the delivery place.

6. An information processing apparatus comprising:
a storage device including a production line information database storing information about a production line for producing products, and
a mobile equipment database storing information on a size of pieces of mobile second equipment; and
a processor configured to execute
receiving order information including information indicating the products, information indicating a quantity of the products, information indicating a delivery deadline and information indicating a position of a delivery place via a communication interface,
referring to the production line information database based on the information indicating the products, and acquiring a series of work processes about the production line, pieces of corresponding first equipment required for the series of work processes and a quantity of production based on production capacity and an operation rate using the production line,
referring to a fixed facility database storing information about a fixed facility, and acquiring pieces of first equipment that can be assigned to the series of work processes, a fixed facility to which the pieces of first equipment belong, a position of the fixed facility, and a size of an installation space of the pieces of second equipment in the fixed facility, for a fixed facility existing within a predetermined distance from the position of the delivery place,
selecting any of a plurality of fixed facilities in descending order about numbers of pieces of first equipment which can be assigned to the series of work processes and located in each of the plurality of fixed facilities, and trying to assign a plurality of pieces of first equipment located in the any of the plurality of fixed facilities to the series of work processes based on information indicating the plurality of pieces of first equipment located in a geographical area and information indicating respective positions about the plurality of pieces of first equipment;
judging that a first fixed facility selected from the plurality of fixed facilities includes an installation space for the pieces of second equipment though pieces of first equipment which can be assigned to all the series of work processes are not located in the first fixed facility, in response to judging that the first fixed facility includes the installation space for the pieces of second equipment though the pieces of first equipment which can be assigned to all the series of work processes are not located in the first fixed facility, referring to the mobile equipment database, extracting available pieces of second equipment from the mobile equipment database, comparing the size of the installation space with the size of the second equipment extracted from the mobile equipment database, judging whether the size of the installation space is larger than the size of the pieces of second equipment, and deciding installation of the pieces of second equipment to be assigned to the installation space in response to the size of the installation space being judged to be larger than the size of the pieces of second equipment;
transmitting request information to transport the pieces of second equipment by a transport vehicle to an installation position in the geographical area to a terminal of a manager of the pieces of second equipment via the communication interface,
calculating a quantity of production of the products per unit time by a production line using the pieces of first equipment and the pieces of second equipment which are assigned to the series of work processes, in response to assignment about the pieces of first equipment and the pieces of second equipment to all the series of work processes ending,
multiplying the quantity of production of the products per unit time by a coefficient determined using a table of correspondence between the coefficient and a distance or transport time between bases including a fixed facility and an external installation space, in response to the production line being constructed across the bases,
deciding construction of an additional production line using the plurality of pieces of first equipment, and the pieces of second equipment received from the transport vehicle, in response to the quantity of the products requested to be delivered by the deadline being not produced with the quantity of production of the products per unit time multiplied by the coefficient; and
causing the construction of the additional production line based on the construction decision.

7. The information processing apparatus according to claim 6, wherein, in response to the size of the installation space being judged to be smaller than the size of the pieces of second equipment, the processor searches for a second fixed facility existing within a predetermined distance from the first fixed facility and assigns unassigned pieces of first equipment located in the second fixed facility to the series of work processes.

8. The information processing apparatus according to claim 6, wherein, in response to the size of the installation space being judged to be smaller than the size of the pieces of second equipment, the processor decides installation of the pieces of second equipment to unassigned processes in an external installation space within a predetermined distance from the first fixed facility.

9. A non-transitory computer-readable storage medium storing a program to cause a processor to execute:
receiving order information including information indicating products to be produced, information indicating a quantity of the products, information indicating a delivery deadline and information indicating a position of a delivery place via a communication interface;
referring to a production line information database storing information about a production line for producing the products based on the information indicating products to be produced, and acquiring a series of work processes about the production line, pieces of corresponding first equipment required for the series of work processes and a quantity of production based on production capacity and an operation rate using the production line;
referring to a fixed facility database storing information about a fixed facility, and acquiring pieces of first equipment that can be assigned to the series of work processes, a fixed facility to which the pieces of first equipment belong, a position of the fixed facility, and a size of an installation space of pieces of mobile second equipment in the fixed facility, for a fixed facility existing within a predetermined distance from the position of the delivery place;
selecting any of a plurality of fixed facilities in descending order about numbers of pieces of first equipment which can be assigned to the series of work processes and located in each of the plurality of fixed facilities, and trying to assign a plurality of pieces of first equipment located in the any of the plurality of fixed facilities to the series of work processes based on information indicating the plurality of pieces of first equipment located in a geographical area and information indicating respective positions about the plurality of pieces of first equipment;
judging that a first fixed facility selected from the plurality of fixed facilities includes an installation space for the pieces of second equipment though pieces of first equipment which can be assigned to all the series of work processes are not located in the first fixed facility, in response to judging that the first fixed facility includes the installation space for the pieces of second equipment though the pieces of first equipment which can be assigned to all the series of work processes are not located in the first fixed facility, referring to a mobile equipment database storing information on a size of the pieces of second equipment, extracting available pieces of second equipment from the mobile equipment database, comparing the size of the installation space with the size of the second equipment extracted from the mobile equipment database, judging whether the size of the installation space is larger than the size of the pieces of second equipment, and deciding installation of the pieces of second equipment to be assigned to the installation space in response to the size of the installation space being judged to be larger than the size of the pieces of second equipment;
transmitting request information to transport the pieces of second equipment by a transport vehicle to an installation position in the geographical area to a terminal of a manager of the pieces of second equipment via the communication interface;
calculating a quantity of production of the products per unit time by a production line using the pieces of first equipment and the pieces of second equipment which are assigned to the series of work processes, in response to assignment about the pieces of first equipment and the pieces of second equipment to all the series of work processes ending;
multiplying the quantity of production of the products per unit time by a coefficient determined using a table of correspondence between the coefficient and a distance or transport time between bases including a fixed facility and an external installation space, in response to the production line being constructed across the bases;
deciding construction of an additional production line using the plurality of pieces of first equipment, and the pieces of second equipment received from the transport vehicle, in response to the quantity of the products requested to be delivered by the deadline being not produced with the quantity of production of the products per unit time multiplied by the coefficient; and
causing the construction of the additional production line based on the construction decision.

\* \* \* \* \*